United States Patent
Miyashita et al.

(10) Patent No.: US 6,795,719 B2
(45) Date of Patent: Sep. 21, 2004

(54) MICROPHONE ASSEMBLY FOR A PORTABLE TELEPHONE WITH A FOLDABLE FLAP ELEMENT

(75) Inventors: Seiji Miyashita, Kanagawa (JP); Masashi Suzuki, Kanagawa (JP); Mamoru Yoshida, Kanagawa (JP); Susumu Otsuki, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/837,049

(22) Filed: Apr. 18, 2001

(65) Prior Publication Data

US 2001/0029198 A1 Oct. 11, 2001

Related U.S. Application Data

(63) Continuation of application No. 09/110,514, filed on Jul. 6, 1998.

(30) Foreign Application Priority Data

Jul. 8, 1997 (JP) .............................................. 9-196393

(51) Int. Cl.⁷ ............................................... H04M 1/00
(52) U.S. Cl. ................................ 455/575.3; 455/575.8; 455/90.3; 455/569.1; 379/433.03; 379/433.13; 379/437
(58) Field of Search .......................... 455/90, 575, 550, 455/569, 350, 575.1–575.8; 379/428, 429, 433, 434, 447, 451, 428.04, 433.03, 437, 433.11, 433.13

(56) References Cited

U.S. PATENT DOCUMENTS

| 5,276,916 A | * | 1/1994 | Pawlish et al. ................ 455/89 |
| 5,768,370 A | * | 6/1998 | Maatta et al. ................ 379/433 |
| 5,836,790 A | * | 11/1998 | Barnett ........................ 439/620 |
| 5,890,052 A | * | 3/1999 | Read et al. .................... 455/90 |

FOREIGN PATENT DOCUMENTS

| EP | 0283853 A2 | * | 3/1987 | ............ H04M/1/72 |
| EP | 0651546 A1 | * | 5/1995 | ............ H04M/1/02 |
| JP | 8140130 |  | 5/1996 |  |

* cited by examiner

Primary Examiner—Duc M. Nguyen
(74) Attorney, Agent, or Firm—Pearne & Gordon LLP

(57) ABSTRACT

A built-in microphone is provided in a flap hinged to a body in a closable manner. Sound-collection holes are formed in interior and exterior flaps of the flap for collecting sound into the microphone. Even when the flap is in either a closed state or an open state, communication becomes feasible.

11 Claims, 3 Drawing Sheets

MICROPHONE ASSEMBLY FOR A PORTABLE TELEPHONE WITH A FOLDABLE FLAP ELEMENT

This application is a continuation of U.S. patent application Ser. No. 09/110,514 filed Jul. 6, 1998.

BACKGROUND OF THE INVENTION (a) Field of the Invention

The present invention relates to a portable communication device in which a built-in microphone is provided inside a flap pivotally provided to a body.

(b) Related, Background Invention

FIG. 7 shows a portable communication device of a related, background invention, which can be used as a cordless telephone, a portable cellular phone, a personal handy-phone system, and so on. The portable communication device comprises a body "a," a flap "b" pivotally provided on the body "a" to open and close with respect to the body, and a built-in microphone "c" provided inside the flap "b."

As shown in FIGS. 7 and 8, the flap "b" of the communication device has such a dual structure that an interior flap "d" and an exterior flap "e" are combined together. A recess "f" is formed in the inner surface of the interior flap "d," and the microphone "c" is fitted into the recess "f" through a microphone holder "g." The microphone holder "g" is sandwiched between the interior flap "d" and the exterior flap "e," so that the microphone "c" is securely held in the flap "b."

A sound-collection hole "h" is formed at a substantially central portion of the recess "f" in the interior flap "d."

In a case where the portable communication device having the foregoing configuration is to be carried, the flap "b" is closed so that the device becomes compact. Therefore, its portability is enhanced, and the flap "b" covers an operation section "i" of the body "a," to avoid inadvertent actuation of the operation section "i."

Further, when the portable communication device is in use, the flap "b" is opened to a position shown in FIG. 7 which permits actuation of the operation section "i" and exposes the sound-collection hole "h" provided in the interior flap "b." Thus, communication is possible under this state such that sound is transmitted to the microphone "c" via the sound-collection hole "h".

However, with the portable communication device having the sound-collection hole "h" formed only in the interior flap "d," sound cannot be collected through the sound-collection hole "h" while the flap "b" is closed, thus disabling communication.

SUMMARY OF THE INVENTION

The present invention has been conceived to solve such a drawback of the above-mentioned portable communication device, and an object of the present invention is to provide a portable communication device which enables communication while a flap is closed.

To accomplish the foregoing object, the present invention provides a portable communication device comprising a body; a flap pivotally provided to a body to be opened and closed relative to the body; a built-in microphone provided inside the flap; and sound-collection holes, respectively provided in interior and exterior flaps, for collecting sound into the microphone. Since sound can be collected into the microphone regardless of whether the flap is closed or opened, communication becomes feasible in either state.

In case where a decorative panel is attached to the outer surface of the exterior flap in order to enhance a aesthetic effect, a sound-collection hole is formed in the panel so as to collect sound into the microphone.

The present disclosure relates to the subject matter contained in Japanese patent application No. Hei. 9-196393 (filed on Jul. 8, 1997) which is expressly incorporated herein by reference in its entirety.

DETAILED DESCRIPTION OF THE PREFERRED EMBODIMENTS

Preferred embodiments of the present invention will now be described in detail with reference to the accompanying drawings.

First Embodiment

Figure 1:
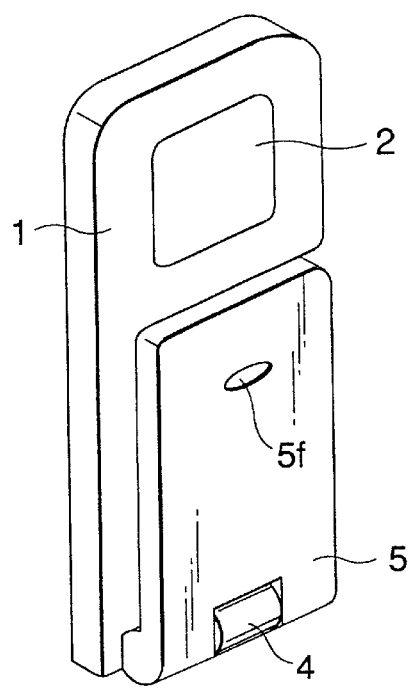
FIG. 1 is a perspective view showing a portable communication device according to a first embodiment of the present invention while a flap is closed.
Figure 2:
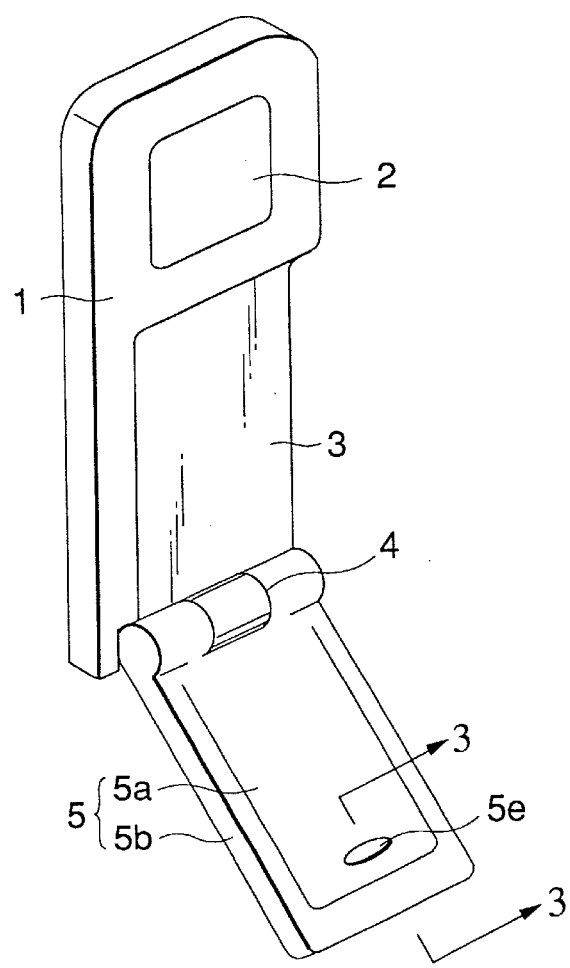
FIG. 2 is a perspective view showing the communication device according to the first embodiment while the flap is opened.

FIG. 1 is a perspective view showing a portable communication device while a flap is closed; FIG. 2 is a perspective view showing the communication device while the flap is opened; and FIG. 3 is a cross-sectional view taken across line 3—3 provided in FIG. 2.

In the drawings, reference numeral 1 designates a body, and a receiver 2 and an operation section 3 are provided on the front surface of the body 1.

A flap 5 is pivotally provided to a lower portion of the front surface of the body 1 by a hinge 4 so that the flap is opened and closed relative to the body 1.

Figure 3:
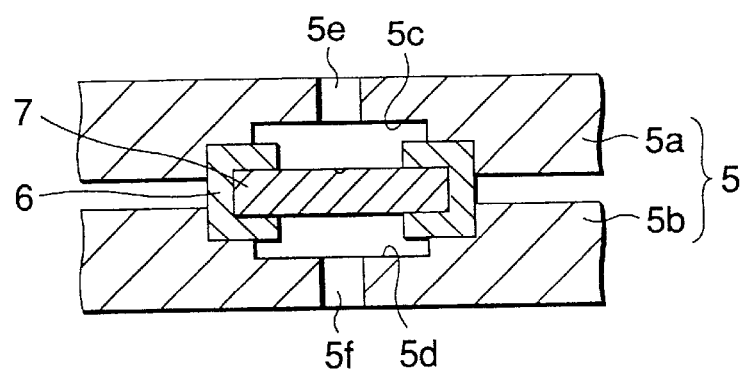
FIG. 3 is a cross-sectional view taken across line 3—3 provided in FIG. 2.

As shown in FIG. 3, the flap 5 has such a dual structure that an interior flap 5a and an exterior flap 5b are combined together. As shown in FIG. 1, the flap 5 is formed in such a size that it can cover substantially the overall operation section 3 when closed about the hinge 4.

As shown in FIG. 3, recesses 5c, 5d are formed so as to oppose each other in the internal, distal portions of the interior and exterior flaps 5a, 5b, respectively. A microphone 7 is fitted into the recesses 5c, 5d with a microphone holder 6 sandwiched between the interior and exterior flaps 5a, 5b, so that the microphone 7 is secured in place to the flap 5.

Sound-collection holes 5e, 5f are formed in substantially central portions of the respective recesses 5c, 5d of the interior and exterior flaps 5a, 5b. When the flap 5 is opened, sound can be collected into the microphone 7 through the sound-collection hole 5e of the interior flap 5a. On the other hand, when the flap 5 is closed, sound can be collected into the microphone 7 through the sound-collection hole 5f of the exterior flap 5b.

The operation of the portable communication device having the foregoing configuration will now be described.

When the portable communication device is to be carried while kept in a pocket, the flap 5 is closed relative to the body 1 as shown in FIG. 1. At this time, the sound-collection hole 5f formed in the exterior flap 5b of the flap 5 becomes exposed to the outside. Accordingly, sound is collected into the microphone 7 through the sound-collection hole 5f of the exterior flap 5b, and thus communication is possible in this state.

So long as an earphone plug is connected into the body 1 so that sound from the portable communication device can be heard, communication becomes feasible while the portable communication device is held in a chest pocket.

Figure 7:
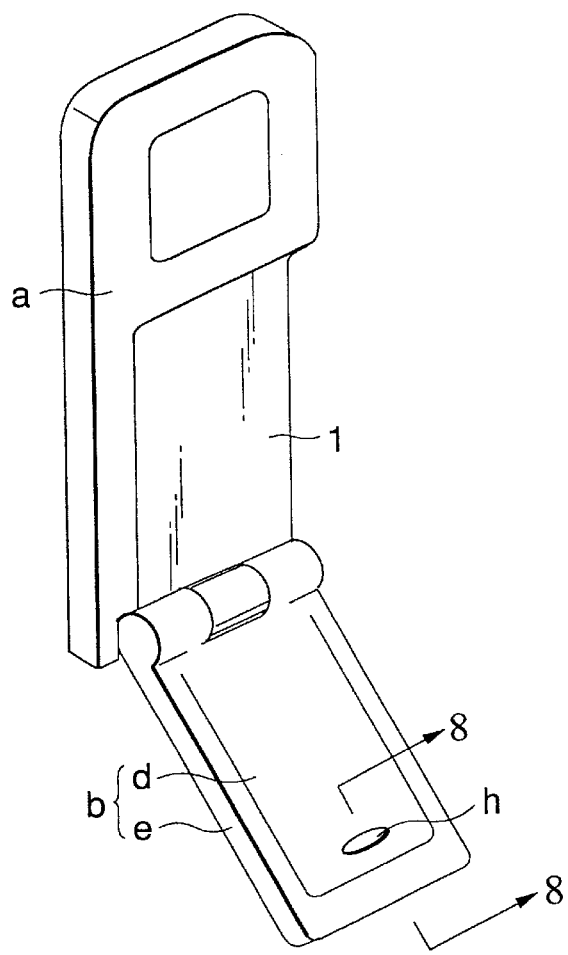
FIG. 7 is a perspective view showing a portable communication device.
Figure 8:
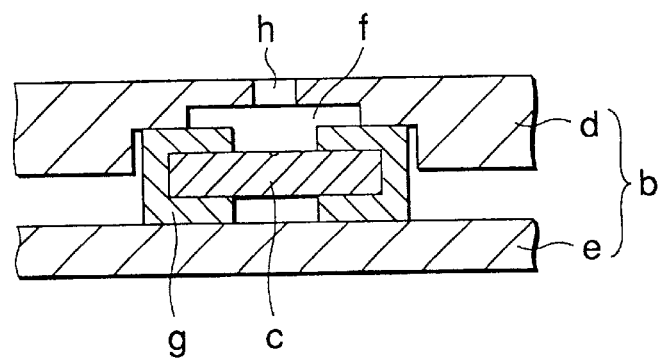
FIG. 8 is a cross-sectional view taken across line 8—8 provided in FIG. 7.

In contrast, if the flap 5 is in an opened state such as that shown in FIG. 2, sound can be collected into the microphone 7 through the sound-collection hole 5e formed in the interior flap 5a, and thus communication is possible as in the case of the portable communication device described with reference to FIGS. 7 and 8.

Second Embodiment

Figure 4:
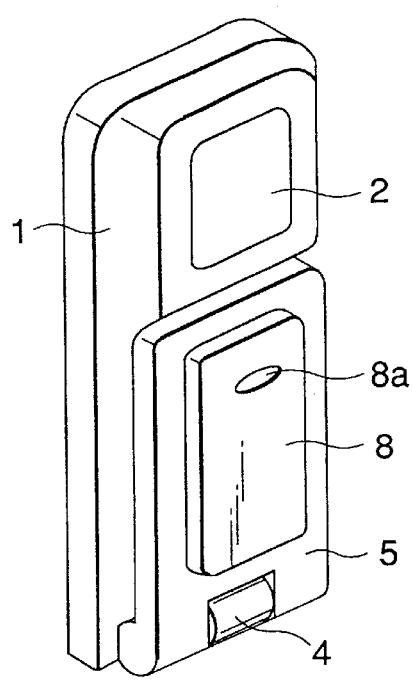
FIG. 4 is a perspective view showing a portable communication device according to a second embodiment of the present invention while a flap is closed.
Figure 5:
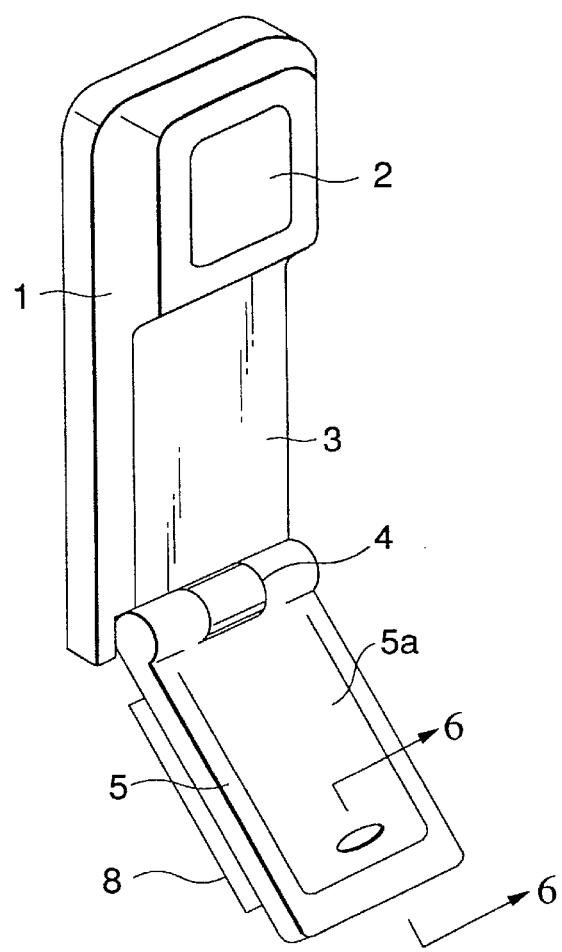
FIG. 5 is a perspective view showing the communication device according to the second embodiment while the flap is opened.
Figure 6:
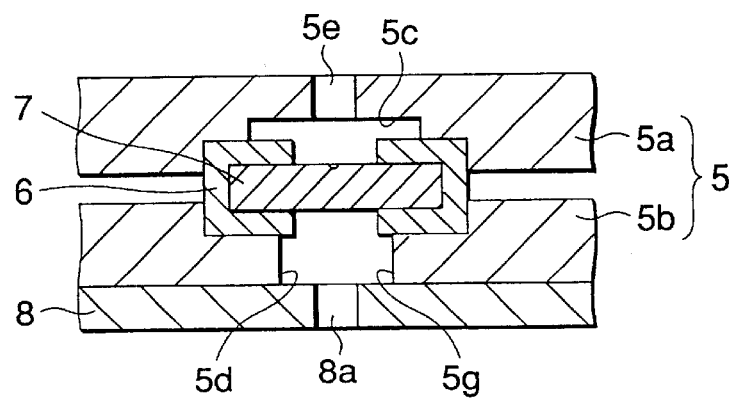
FIG. 6 is a cross-sectional view taken across line 6—6 provided in FIG. 5.

FIGS. 4 through 6 designate another embodiment of the present invention directed to a portable communication device in which a panel 8, such as a decorative panel, is attached to the outer surface of the exterior flap 5b. A sound-collection hole 5g formed in the center of the recess 5d of the exterior flap 5b in the second embodiment (the recess 5d and the sound-collection hole 5g are shown as having the same size in FIG. 6) is sufficiently greater in diameter than the sound-collection hole 5f in the first embodiment.

In the panel 8 attached to the outer surface of the exterior flap 5b by fixing means such as an adhesive, a sound-collection hole 8a which is substantially the same in size as the sound-collection hole 5e of the interior flap 5a is formed so as to match in position the sound-collection hole 5g of the exterior flap 5b.

In other respects, the second embodiment is identical to the first embodiment, and hence further descriptions will be omitted here.

The operation of the portable communication device having the foregoing configuration will now be described. When the portable communication device is to be carried while held in a pocket, the flap 5 is closed as shown in FIG. 4. At this time, the sound-collection hole 8a formed in the panel 8 attached to the outer surface of the exterior flap 5b is exposed to the outside. Accordingly, sound can be collected into the microphone 7 through the sound-collection hole 8a of the panel 8, and thus communication is possible under this state.

So long as an earphone plug is connected to the body 1 so that sound can be heard, communication becomes feasible while the portable communication device is held in a chest pocket.

On the other hand, while the flap 5 is in an opened state such as that shown in FIG. 5, sound can be collected into the microphone 7 through the sound-collection hole 5e formed in the interior flap 5a, and thus communication is possible as in the case of the portable communication device described with reference to FIGS. 7 and 8.

What is claimed is:

1. A portable communication device comprising:
a body;
an operation section provided on the body;
a flap pivotally secured to the body and including an interior flap and an exterior flap, said flap being movable between a closed position, in which a surface of the interior flap is disposed adjacent said body covering the operation section, and an open position, wherein said flap extends from said body;
a panel attached only to an outer surface of the exterior flap;
a built-in microphone provided inside the flap;
first and second sound-collection holes for collecting sound into the microphone, said first sound-collection hole being formed in said interior flap and said second sound-collection hole being formed in said exterior flap, wherein said first sound-collection hole is substantially covered by said body when said flap is in said closed position, and a further sound-collection hole, provided in the panel, for collecting sound into the microphone, and wherein said first sound-collection hole, said second sound-collection hole and said built-in microphone are disposed on a common axis; and
wherein said first sound-collection hole comprises a recess portion and a communicating hole, a width of said recess portion being larger than that of said communicating hole, and a width of said second sound-collection hole is larger than that of said further sound-collection hole.

2. A portable communication device according to claim 1, wherein said second sound-collection hole is larger than the first sound collection hole.

3. A portable communication device according to claim 2, wherein the further sound-collection hole is aligned with the second sound-collection hole.

4. A portable communication device according to claim 2, wherein the further sound-collection hole is substantially the same size as the first sound-collection hole.

5. A portable communication device according to claim 2 further comprising a first recess in the interior flap for receiving the microphone and a second recess in the exterior flap for receiving the microphone.

6. A portable communication device according to claim 1, wherein the further sound-collection hole is substantially the same size as the first sound-collection hole.

7. The portable communication device of claim 1, wherein said panel only partially covers the outer surface of said exterior flap.

8. A portable communication device according to claim 1 further comprising a first recess in the interior flap for receiving the microphone and a second recess in the exterior flap for receiving the microphone.

9. A portable communication device comprising:
a body;
an operation section provided on the body;
a flap pivotally secured to the body and including an interior flap and an exterior flap, said flap being movable between a closed position, in which a surface of the interior flap is disposed adjacent said body covering the operation section, and an open position, wherein said flap extends from said body;
a panel attached only to an outer surface of the exterior flap;
a built-in microphone provided inside the flap;
first and second sound-collection holes for collecting sound into the microphone, said first sound-collection hole being formed in said interior flap and said second sound-collection hole being formed in said exterior flap, wherein said first sound-collection hole is substantially covered by said body when said flap is in said closed position, and a further sound-collection hole, provided in the panel, for collecting sound into the microphone, and wherein said first sound-collection hole, said second sound-collection hole and said built-in microphone are disposed on a common axis.

10. The portable communication device of claim 9, wherein said panel only partially covers the outer surface of said exterior flap.

11. The portable communication device of claim 9, wherein the outer surface of said exterior flap is exposed around a perimeter of said panel.

* * * * *